(12) United States Patent
Tanaka et al.

(10) Patent No.: US 9,063,569 B2
(45) Date of Patent: Jun. 23, 2015

(54) VEHICULAR DEVICE

(75) Inventors: Tetsuhiko Tanaka, Okazaki (JP);
Takeshi Kawashima, Nisshin (JP);
Daigo Akutsu, Gifu (JP)

(73) Assignee: DENSO CORPORATION, Kariya (JP)

( * ) Notice: Subject to any disclaimer, the term of this patent is extended or adjusted under 35 U.S.C. 154(b) by 229 days.

(21) Appl. No.: 13/331,452

(22) Filed: Dec. 20, 2011

(65) Prior Publication Data

US 2012/0162069 A1 Jun. 28, 2012

(30) Foreign Application Priority Data

Dec. 24, 2010 (JP) ................. 2010-288637

(51) Int. Cl.
*G09G 5/08* (2006.01)
*G06F 3/01* (2006.01)
*G06F 3/0481* (2013.01)

(52) U.S. Cl.
CPC ............ *G06F 3/016* (2013.01); *G06F 3/04812* (2013.01)

(58) Field of Classification Search
CPC ......... G06F 3/016; G06F 3/033; G06F 3/048; G06F 3/04812; G06F 17/00; G09G 5/00; G09G 5/08
USPC .......... 715/784, 800, 810, 838; 345/157, 184, 345/661; 701/208, 1, 29; 340/995; 364/449.5
See application file for complete search history.

(56) References Cited

U.S. PATENT DOCUMENTS

| | | | | |
|---|---|---|---|---|
| 5,731,979 A | * | 3/1998 | Yano et al. ............. | 701/455 |
| 2003/0018427 A1 | * | 1/2003 | Yokota et al. ............. | 701/208 |
| 2007/0226646 A1 | * | 9/2007 | Nagiyama et al. ............. | 715/784 |
| 2008/0115089 A1 | * | 5/2008 | Lee et al. ............. | 715/838 |
| 2008/0221747 A1 | * | 9/2008 | Baumann et al. ............. | 701/29 |
| 2009/0284467 A1 | | 11/2009 | Itoh et al. | |
| 2009/0307588 A1 | | 12/2009 | Tauchi et al. | |
| 2010/0100846 A1 | * | 4/2010 | Yoshida ............. | 715/810 |
| 2010/0182342 A1 | * | 7/2010 | Houllier et al. ............. | 345/661 |
| 2010/0223577 A1 | * | 9/2010 | Bennett et al. ............. | 715/800 |

FOREIGN PATENT DOCUMENTS

| | | |
|---|---|---|
| JP | 6-103013 | 4/1994 |
| JP | 2004-271439 | 9/2004 |
| JP | 2009-301263 | 12/2009 |
| JP | 2010-019790 | 1/2010 |
| JP | 2011-107738 | 6/2011 |

* cited by examiner

*Primary Examiner* — Lun-Yi Lao
*Assistant Examiner* — Johny Lau
(74) *Attorney, Agent, or Firm* — Harness, Dickey & Pierce, PLC (57) ABSTRACT

A control unit indicates a cursor on a screen of an indication unit according to operation data sent from an operation unit based on user's operation of an operation knob. The control unit implements enlarging indication of a screen region corresponding to a selection item image indicated on the screen of the indication unit. When the control unit implements contracting indication to return an enlarged screen region subsequent to the enlarging indication, the control unit indicates contraction of the screen region in a visually recognizable form and indicates the cursor to follow the screen region. The operation unit further causes a driving force generation unit to generate a driving force to move the operation knob correspondingly to the position of the cursor, according to information on the position of the cursor sent from the control unit.

12 Claims, 6 Drawing Sheets

EXAMPLE OF COUNTER FORCE MAP ON OPERATION SCREEN

VEHICULAR DEVICE

CROSS REFERENCE TO RELATED APPLICATIONS

This application is based on Japanese Patent Application No. 2010-288637 filed on Dec. 24, 2010, the contents of which are incorporated in their entirely herein by reference.

TECHNICAL FIELD

The present invention relates to a vehicular device configured to implement enlarging indication of a screen region corresponding to a selection item image indicated on a screen of an indication unit thereby to facilitate user's instruction for selecting an item.

BACKGROUND

For example, a known conventional system causes an indication screen of a display device (vehicular display device), such as a navigation device, an airconditioner, and/or an audio device, in a vehicle to indicate instruction of an operation to the vehicular device. The indication screen may be a liquid crystal display or the like configured to indicate a selection item image, such as a button. When the position of the selection item image is instructed on such a liquid crystal display, the vehicular device is manipulated according to the instruction.

In consideration of reduction in movement of the viewpoint in such a system under driver's driving operation, it is preferable to locate the indication screen at an upper position distant from a driver as much as possible. To the contrary, it is preferable to locate an operation unit, which is for instructing the position on the indication screen, close to a hand of a driver.

In consideration of this, a remote control system being in practice includes an indication screen and an operation unit for the indication screen, which are separated from each other. In such a remote control system, a cursor is indicated on the indication screen and movable in response to operation of a control lever of the operation unit. The cursor is used to instruct the position on the indication screen.

For example, a known remote control system employs a slidable control lever and uniquely associates the position of the cursor on the indication screen and the position of the control lever in a movable range of the control lever to enable an absolute operation. In addition, it is suggested to apply a counter force (resisting force and assisting force) to such a control lever according to a content indicated on the indication screen thereby to support driver's operation in a tactile manner and to enhance operability.

For example, patent application publication US 2010/0100846 A1 (JP-A-2010-96669) discloses an art to apply such a counter force to a control lever when a cursor is close to a selection item image thereby to draw the cursor into the selection item image. In this way, the operation of the control lever is assisted. More specifically, a counter force map is defined with respect to an indication screen for applying the counter force to the control lever according to the position of the selection item image. In addition, the counter force is applied to the control lever according to the counter force map for assisting the operation of the control lever. With the present configuration, instruction to the selection item image can be facilitated. Thus, operability can be enhanced.

It is conceivable to employ such a selection item image being small relative to the indication screen. In this case, it becomes difficult to match a cursor to the selection item image, even if the counter force is applied to the control lever.

In addition, it is conceivable to employ multiple selection item images indicated at close positions. In this case, it may be difficult to match a cursor to a desired selection item image due to unintentional counter force applied to draw the cursor into an undesirable selection item image. Consequently, operability may be impaired.

In consideration of this, a screen region may be defined correspondingly to a selection item image. In this case, it is conceivable to enlarge the screen region when the cursor moves to the screen region. Further, it is conceivable to contract the screen region thereby to return the screen region to the initial state after a specific operation is made.

Figure 5A:
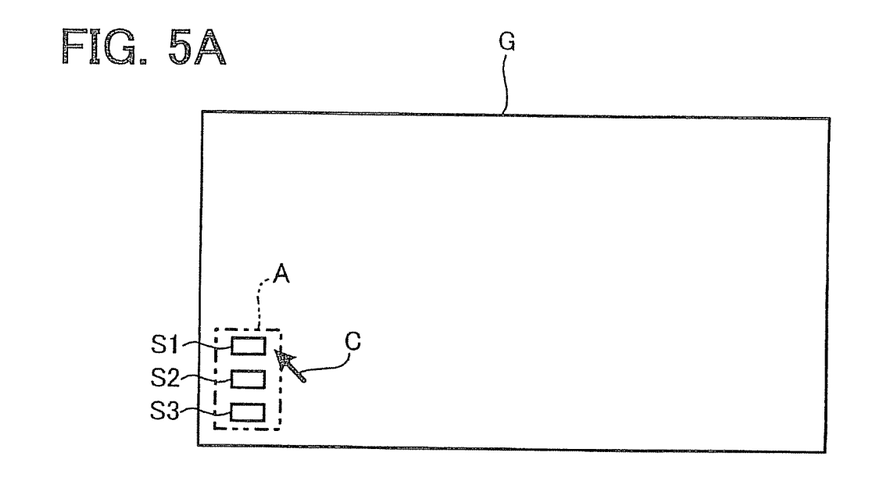
FIGS. 5A to 5C are explanatory views showing an example of enlargement of the screen region.
Figure 5B:
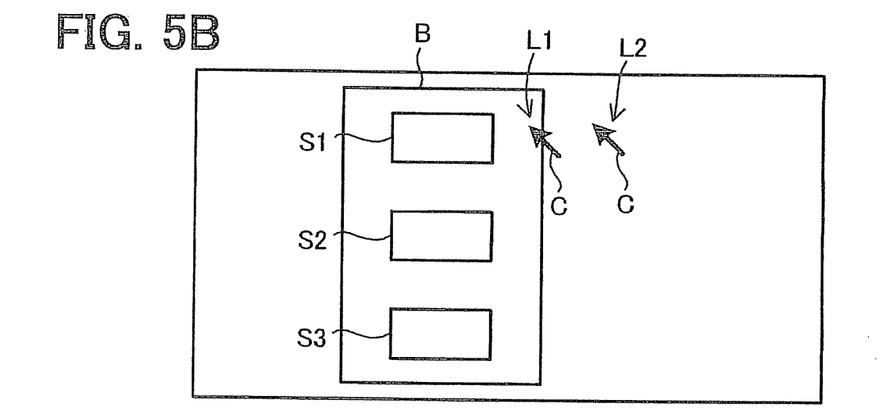

Specifically, as shown in FIG. 5A, when buttons (selection item images) S1, S2, S3 are small relative to an indication screen G, a screen region A represented by the two-dot chain line may be defined. In this case, as shown in FIG. 5B, when a cursor C moves into the screen region A, the screen area A is enlarged. For example, as represented by the symbol B, the screen region may be enlarged, and the buttons S1 to S3 may be indicated. Furthermore, the screen region B may be contracted and returned on condition that, for example, the cursor C moves to the position L2 outside the screen region B.

Figure 5C:
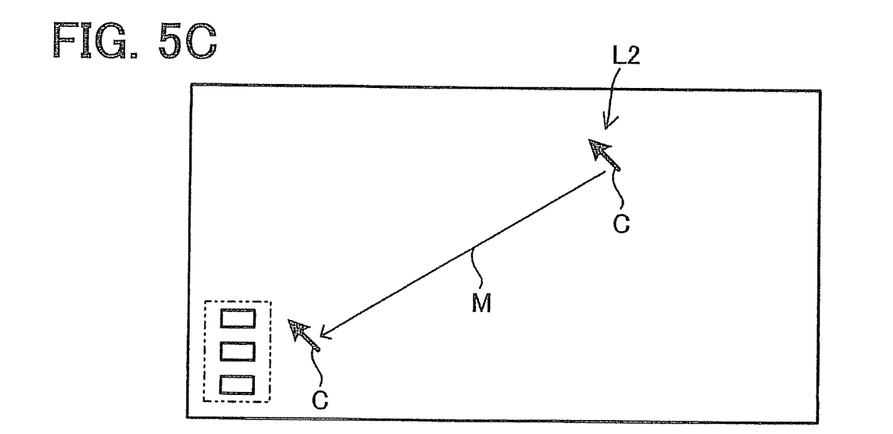

In this case, as shown in FIG. 5C, the cursor C may be moved to the position close to the original screen region with contraction of the screen region B. The movement of the cursor C may be effective not to be indicated at the irrelative position L2.

In the above-described absolute operation, it is necessary to move the position of the control lever correspondingly to the movement of the cursor. It is noted that, in a configuration in which the indication position of the cursor is controlled automatically, a user may have uncomfortable feeling about the movement of the control lever when the user cannot recognize the movement of the cursor, as represented by the symbol M in FIG. 5C.

SUMMARY

In view of the foregoing and other problems, it is an object of the present invention to produce a vehicular device configured to apply force to a control lever according to movement of a cursor and to restrain a user from having uncomfortable feeling due to the movement of the control lever.

According to an aspect of the present invention, a vehicular device configured to implement enlarging indication of a screen region corresponding to a selection item image indicated on a screen of an indication unit, the vehicular device comprises an operation unit including: an operation knob movable according to an operation by a user; and a driving force generation unit configured to generate a driving force for moving the operation knob. The vehicular device further comprises a control unit configured to indicate a cursor on the screen of the indication unit according to operation data being sent from the operation unit based on an operation of the operation knob. The control unit is further configured to, when implementing contracting indication to return an enlarged screen region subsequent to the enlarging indication of the screen region: indicate contraction of the screen region in a form being visually recognizable to a user; and indicate the cursor to follow the screen region. The operation unit is further configured to cause the driving force generation unit to move the operation knob correspondingly to a position of the cursor, according to information on the position of the cursor sent from the control unit.

According to another aspect of the present invention, a method for controlling an operation unit in combination with a control unit of a vehicular device, the method comprises causing the operation unit to send use's operation data of an operation knob to the control unit. The method further comprises causing the control unit to indicate a cursor on a screen of an indication unit according to the use's operation data sent from the operation unit. The method further comprises causing the control unit to send information on a position of the cursor to the operation unit. The method further comprises causing the control unit to implement enlarging indication of a screen region to form an enlarged screen region corresponding to a selection item image indicated on the screen. The method further comprises causing the control unit to implement simultaneously: contracting indication to return the enlarged screen region subsequent to the enlarging indication to contract the enlarged screen region in a form being visually recognizable for a user; and indication of the cursor to follow the screen region. The method further comprises causing the operation unit to generate a driving force for moving the operation knob correspondingly to the position of the cursor according to the information on the position of the cursor sent from the control unit.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1:
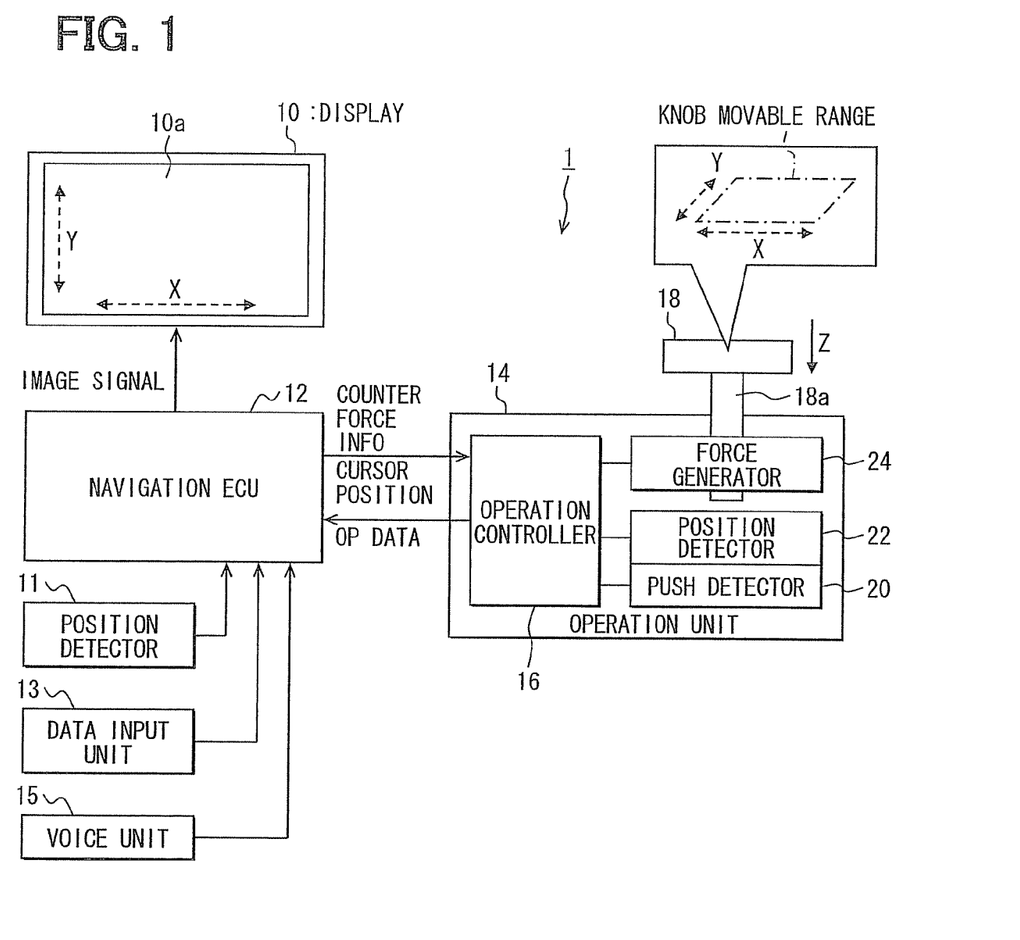
FIG. 1 is a block diagram showing a configuration of a navigation device.

As follows, an embodiment of the present invention will be described with reference to drawings. FIG. 1 is a block diagram showing a navigation device 1 according to the present embodiment.

The navigation device 1 is equipped in a vehicle. As shown in FIG. 1, the navigation device 1 includes a display unit 10, a position detector unit 11, a navigation ECU 12, a data input unit 13, an operation unit 14, and an audio output unit 15. The position detector unit 11 detects the present position of the vehicle. The data input unit 13 inputs various data, such as map data and a program, stored in a storage medium. The operation unit 14 is manipulated by an operator (user).

Figure 2:
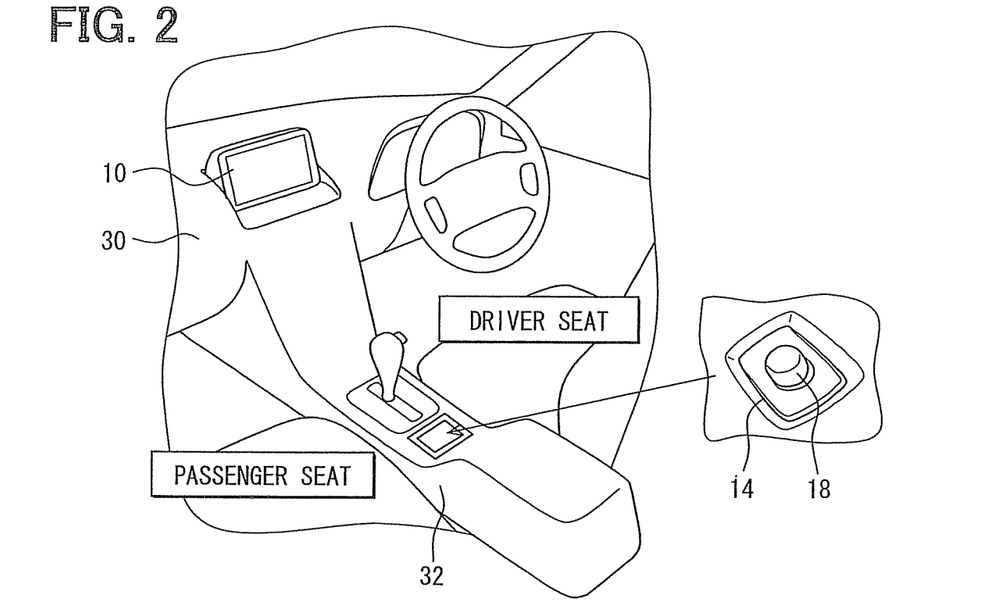
FIG. 2 is an explanatory view showing arrangement of a display unit and an operation unit in a vehicle interior.

As shown in FIG. 2, the display unit 10 is located on a dashboard 30 ahead a driver and located at an intermediate position between the driver's seat and the passenger seat in the interior of the vehicle such as an automobile. In the present arrangement, movement in viewpoint of the driver is reduced when the driver looks at an indication screen of the display unit 10. The operation unit 14 is located on the upper surface of a center console 32 adjacent to the driver's seat. In the present arrangement, the operation unit 14 can be manipulated easily by the driver, without requiring the driver to extend driver's hand to a distant place or to change driver's posture largely.

Referring to the block diagram of FIG. 1, The display unit 10 has an indication screen 10a being a color display device such as a liquid crystal display. The display unit 10 is configured to cause the indication screen 10a to indicate various images according to an image signal received from the navigation ECU 12. For example, the indication screen 10a indicates a mark, which represents the present position of the vehicle, a guiding path to a destination, a name, and additional data, such as a button represented by a symbol, are overlapped on a map image when the vehicle is traveling.

The operation unit 14 is a pointing device for inputting a moving direction of a cursor on the indication screen 10a and for inputting an instruction. The operation unit 14 includes an operation knob 18 moved by the operator such as the driver of the vehicle. The operation knob 18 is movable along a plane perpendicular to the axial direction of a shaft portion 18a of the operation knob 18 in two-dimensional surface including the direction represented by the symbol X and the direction represented by the symbol Y. In the present embodiment, the movable region of the operation knob 18 in the two-dimensional surface is in a rectangular area having the aspect ratio same as that of the indication screen 10a, which is generally in a rectangle shape. As represented by the arrow Z in FIG. 1, the operation knob 18 is also movable in the direction downward along the axial direction of the shaft portion 18a. When the operation knob 18 is not applied with force downward by the operator, i.e., when the operation knob 18 is not pushed, the operation knob 18 returns upward in the axial direction to its regular position.

The operation unit 14 includes an operation control unit 16, a push operation detection sensor 20, a position detection sensor 22, and a driving force generation unit 24. The push operation detection sensor 20 detects push of the operation knob 18 in the Z-axis direction. The position detection sensor 22 detects the positional coordinates of the operation knob 18 in the X-axis direction and the Y-axis direction. The driving force generation unit 24 supports the shaft portion 18a of the operation knob 18 and is configured to apply driving force to the shaft portion 18a. For example, the driving force generation unit 24 applies counter force such as resisting force and/or assisting force to the shaft portion 18a according to manipulation force of the operation knob 18 in the X-axis direction and the Y-axis direction.

The operation control unit 16 associates the coordinates in the indication screen 10a of the display unit 10 uniquely with the coordinates in the movable region of the operation knob 18 in the X-axis direction and the Y-axis direction. The coordinates of the operation knob 18 in the movable region is outputted as operation data to the navigation ECU 12. The navigation ECU 12 indicates an arrow-shaped cursor on the indication screen 10a at the position corresponding to the coordinates of the operation knob 18. In the present configuration, when the position of the operation knob 18 moves to an arbitrary position in the movable region according to operator's manipulation, the cursor also moves to the corresponding position on the indication screen 10a.

When the navigation ECU 12 moves the indication position of the cursor, the navigation ECU 12 outputs the cursor position to the operation control unit 16. In response to this, the operation control unit 16 generates driving force to the shaft portion 18a so that the coordinates on the indication screen 10a uniquely corresponds to the coordinates of the operation knob 18 in the movable region. Thus, when the cursor position on the indication screen 10a is changed, the operation knob 18 is moved to the corresponding position in the movable region in this way.

In addition, when a determination operation is implemented by pushing the operation knob 18 in the Z-axis direction, the operation control unit 16 determines that instruction is made at the cursor position. Thus, the operation control unit 16 outputs information on the determination operation to the navigation ECU 12.

Furthermore, the operation control unit 16 applies counter force (resisting force and/or assisting force) to the operation knob 18 via the driving force generation unit 24 at a predetermined position according to a content of counter force map. The counter force map is defined with counter force information inputted from the navigation ECU 12.

The position detector unit 11 includes a GPS receiver, a gyroscope, a vehicle speed sensor, and the like. The GPS receiver receives an electric wave transmitted from a space satellite for the global positioning system (GPS) thereby to detect the positional coordinates of the vehicle. The gyroscope outputs its detection signal according to the angular speed of a rotary motion caused in the vehicle. The vehicle speed sensor outputs its detection signal according to the speed of the vehicle. Thus, the position detector unit 11 causes the sensors to complement each other thereby to detect the present position of the vehicle.

The data input unit 13 reads various programs and various data, such as map data for navigation processings, stored in a storage medium such as a DVD-ROM and/or a hard disk drive. The data input unit 13 outputs the read programs and data to the navigation ECU 12.

The audio output unit 15 causes voice to notify a user of various kinds of information. Thus, both the indication on the display unit 10 and the voice output of the audio output unit 15 enable to provide various kinds of information to a user.

The navigation ECU 12 controls the entire devices. The navigation ECU 12 mainly includes, for example, a generally-known microcomputer including a CPU, a ROM, a RAM, an I/O device, and a bus line, which connects thereamong. The navigation ECU 12 implements various processings according to programs read from the ROM or the data input unit 13.

For example, navigation-related processings include a map indication processing, a route guidance processing, and the like. In the map indication processing, the present position of the vehicle is calculated according to the detection signal of the position detector unit 11, and a map around the present position is read from the data input unit 13 and indicated at a predetermined scale size. In addition, the present position is moved, and the map image being indicated is scrolled or changed in scale size according to a scroll operation of the map and an indication-range changing operation of the map, respectively. In the route guidance processing, an optimal path from the present position to the destination is calculated according to the map data read from the data input unit 13, the destination specified by a user, and the like. In addition, the calculated optimal path is indicated on the map image, and the traveling guidance is implemented with voice and graphical indication. A cost calculation method, such as the Dijkstra method, is known as a method for calculating the optimal path to the destination automatically.

Subsequently, setting of the counter force information to the operation unit 14 will be described. The navigation ECU 12 causes the indication screen 10a of the display unit 10 to indicate a graphical image, such as a button, and accepts operation from an operator via the operation unit 14. The navigation ECU 12 further determines the coordinates inputted via the operation unit 14 to be the instructed position on the indication screen 10a. When the determination operation is made on the buttons on the indication screen 10a by using the operation unit 14, the navigation ECU 12 receives information representing that the determination operation is made.

When accepting the operation from the operator via the operation unit 14, the navigation ECU 12 sends information representing the positional coordinates of each button and counter force information to the operation unit 14. The counter force information includes a counter force map corresponding to the buttons and defining drawing-in counter force and the like. The counter force information is, for example, defined with a data table in the form of a matrix uniquely corresponding to the coordinates of the movable region of the operation knob 18.

Figure 3:
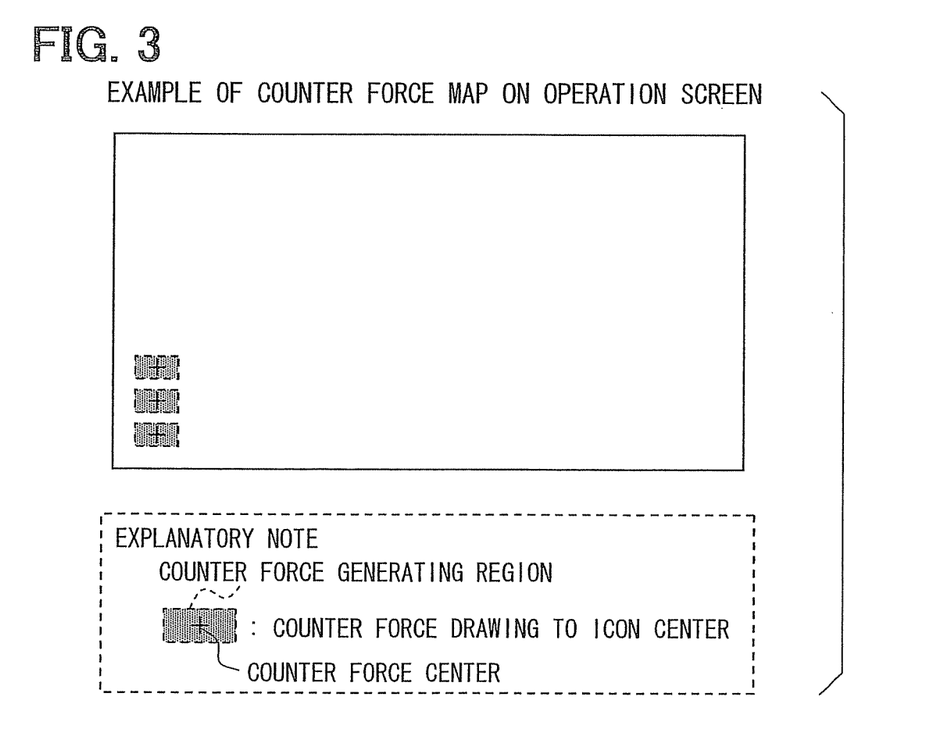
FIG. 3 is an explanatory view showing a counter force map correspondingly set on the indication screen.

FIG. 3 is a schematic view showing the counter force map defined in the counter force information of the navigation ECU 12 corresponding to the indication screen 10a. FIG. 3 corresponds to FIG. 5A. In FIG. 3, a generation range of the drawing-in counter force is shown by the gray portion. The generation range of the drawing-in counter force corresponds to the position and the shape of each of the buttons S1 to S3 in the indication screen 10a.

The counter force information is defined such that the assisting force is applied to the operation knob 18 toward the center of the counter force generation range denoted by "+" when the operation knob 18 is located at the coordinates in the generation range of the drawing-in counter force.

The counter force generation range shown in FIG. 3 corresponding to each of the buttons S1 to S3 on the indication screen 10a shown in FIGS. 5A to 5C is set to be relatively greater than the size of the corresponding button. In the present configuration, the draw-in counter force can be generated when the cursor moves close to the button. Thus, the instructed position of the cursor can be easily matched with the position of the button.

In the example of FIG. 5A, the size of each of the buttons S1 to S3 is small relative to the indication screen G. Therefore, even when the counter force is applied to the operation knob (control lever) 18, it is difficult to match the cursor with the buttons S1 to S3. In addition, when the multiple buttons S1 to S3 are indicated at positions close to each other, the draw-in counter force may be unintentionally caused toward the buttons S1 to S3. Consequently, it is difficult to match the cursor with the desired one of the buttons S1 to S3.

In consideration of this, as shown in FIG. 5A, when the buttons S1 to S3 are small relative to the indication screen G, the screen region A represented by the two-dot chain line is defined. In this case, when the cursor C moves into the screen region A, the screen region A is enlarged. That is, as shown in FIG. 5B, the enlarged screen region B is indicated. In addition, the indicated buttons S1 to S3 are also enlarged.

Figure 4:
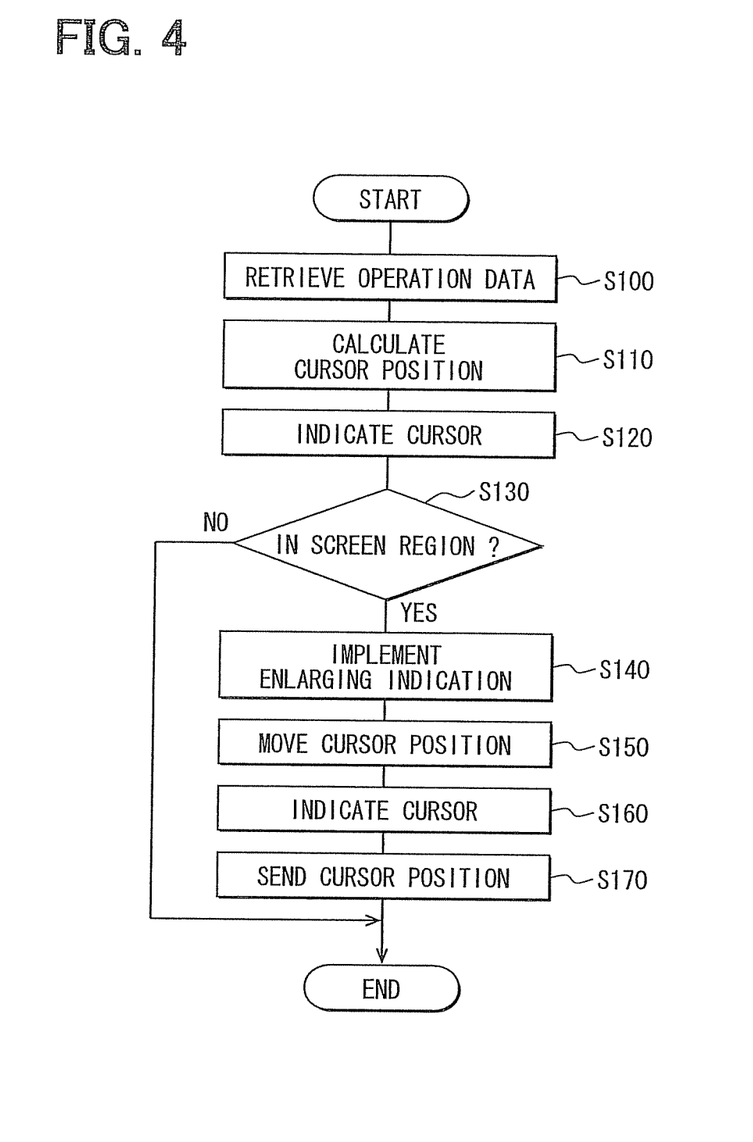
FIG. 4 is a flow chart showing a screen region enlarging processing.

Hereafter, a screen region enlarging processing will be described in detail. FIG. 4 is a flow chart showing the screen region enlarging processing. At S100, operation data is first retrieved. The present processing is implemented to retrieve the operation data according to the operation of the operation knob 18 sent from the operation control unit 16.

At subsequent S110, the cursor position is calculated. Specifically, the positional coordinates of the operation knob 18 can be derived from the operation data. Therefore, the cursor position on the indication screen 10a uniquely corresponding to the operation knob 18 is calculated.

At subsequent S120, the cursor is indicated. Specifically, the present processing is implemented to indicate the cursor at the cursor position calculated at S110. At S130, it is determined whether the cursor position is in the screen region. The processing is implemented to determine whether the cursor position is in the screen region being the enlarged object. When it is determined that the cursor position is in the screen region (S130: YES), the processing proceeds to S140. Alternatively, when it is determined that the cursor position is out of the screen region (S130: NO), the screen region enlarging processing is terminated without execution of the subsequent processings.

At S140, the enlarging indication is implemented. Thus, as shown in FIG. 5B, the buttons S1 to S3 are enlarged and indicated in the screen region B. At subsequent S150, the cursor position is moved with the enlarging indication of S140. At subsequent S160, the cursor is indicated. For example, as shown in FIG. 5B, the cursor C is moved to the position L1 and indicated.

At subsequent S170, the cursor position is sent. The present processing is implemented to cause the navigation ECU 12 to send the cursor position to the operation control unit 16. In response to this processing, the operation control unit 16 applies the driving force to the shaft portion 18a, so that the coordinates in the indication screen 10a uniquely corresponds to (coincides with) the coordinates in the movable region of the operation knob 18. Thus, the operation knob 18 moves to the corresponding position in the movable region.

Figure 6:
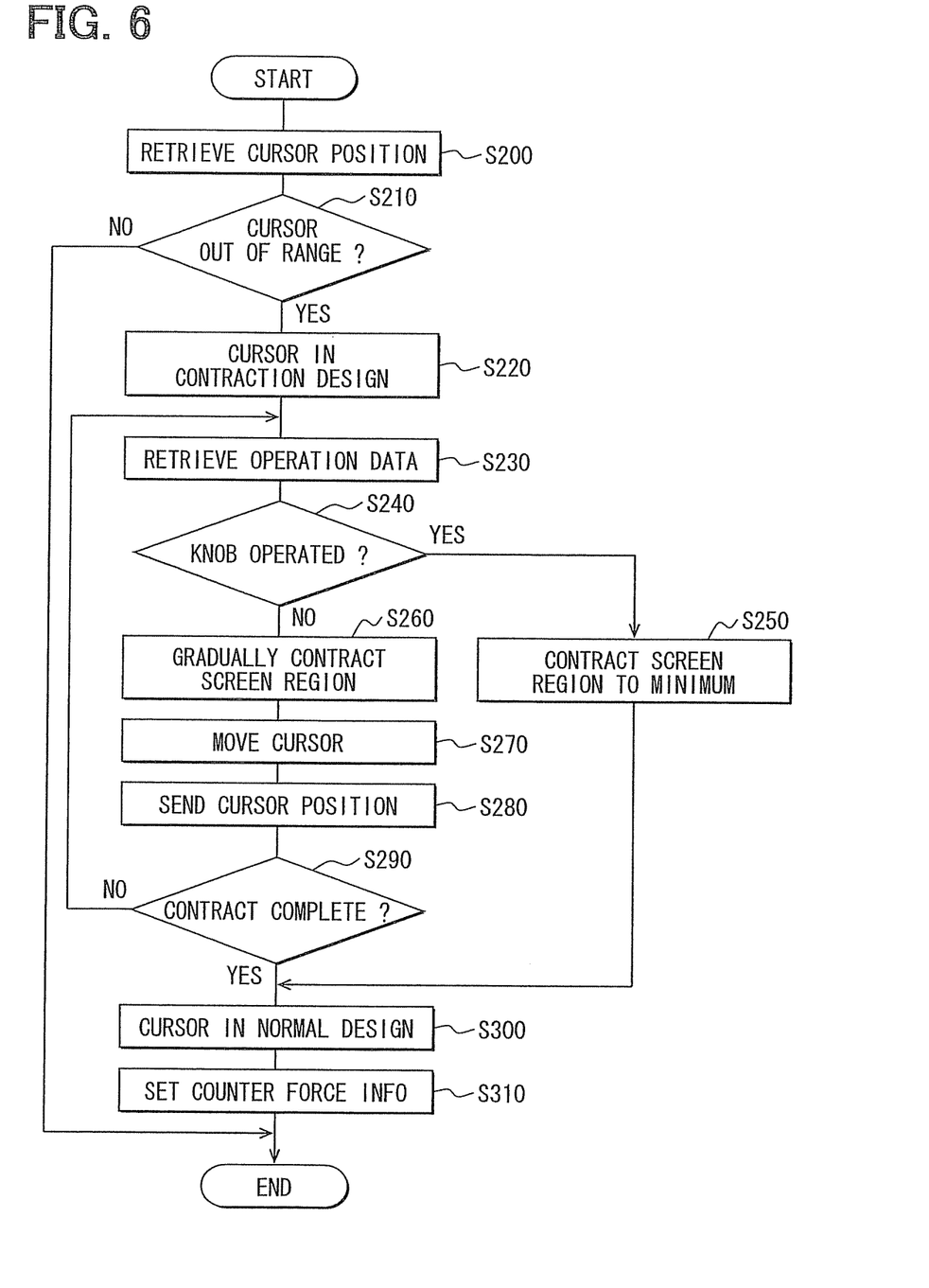
FIG. 6 is a flow chart showing a cursor moving processing.

Subsequently, contraction of the screen region will be described in detail. As shown in FIG. 5B, when the cursor C moves to the outside of the enlarged screen region B, that is, when the cursor C moves from the position L1 to the position L2, the screen region B is contracted and returned. Subsequently, a cursor moving processing will be described in detail. The cursor moving processing is implemented to contract the screen region and to move the cursor in response to the contraction. FIG. 6 is a flow chart showing the cursor moving processing.

In the beginning, at S200, the cursor position is first retrieved. The processing is implemented to retrieve the positional coordinates of the cursor in the indication screen 10a. At subsequent S210, it is determined whether the cursor is out of the region. The processing is implemented to determine whether the cursor is outside the enlarged screen region. When it is determined that the cursor is outside the region (S210: YES), the processing proceeds to S220. Alternatively, when it is determined that the cursor is not outside the region (S210: NO), the present cursor moving processing is terminated without execution of the subsequent processings.

At subsequent S220, the design of the cursor is modified to a design when being contracted. For example, as shown by the cursor C in FIG. 7, it is conceivable to modify the tip end portion of the cursor being an arrow mark into a round mark. At S230, the operation data is retrieved. The present processing is implemented to retrieve the operation data according to the operation of the operation knob 18 sent from the operation control unit 16, similarly to S100 in FIG. 4. At subsequent S240, it is determined whether the operation knob 18 is operated. The operation includes disturbance of movement of the operation knob 18 caused by the operation control unit 16. When it is determined that the operation knob 18 is operated (S240: YES), the processing proceeds to S250 where the contraction of indication of the screen region is completed. Thus, the processing proceeds to S290. Alternatively, when it is determined that the operation knob 18 is not operated (S240: NO), the processing proceeds to S260.

Figure 7:
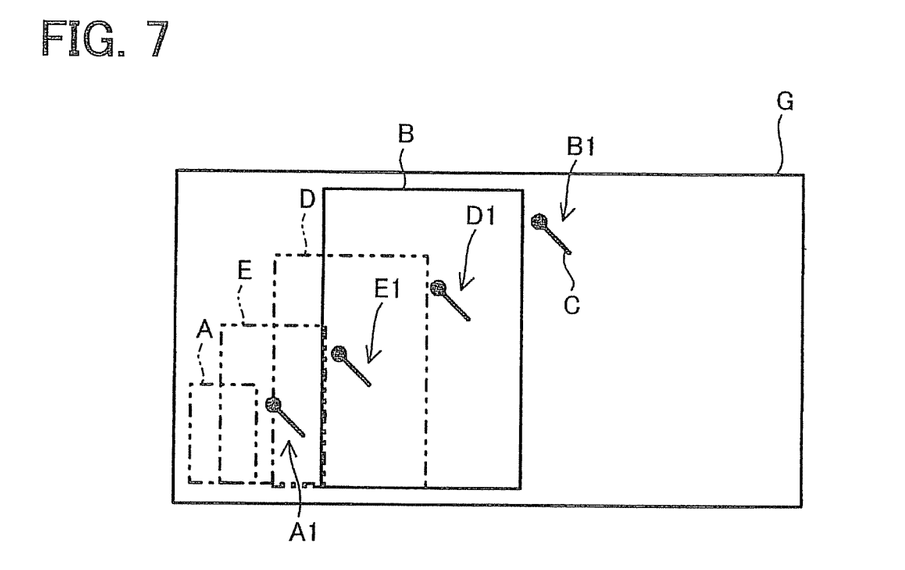
FIG. 7 is an explanatory view showing an example of movement of a cursor.

At S260, the contraction of the screen region is implemented. The present processing is implemented to contract the screen region thereby to update the indication. For example, as shown in FIG. 7, the screen region B is contracted to the screen region D, and the indication is updated.

At subsequent S270, the cursor is moved and indicated. The processing is implemented to move the cursor to the position corresponding to the screen region being contracted and to indicate the cursor. In the example of FIG. 7, when the screen region D is indicated, the cursor is moved to the position D1 corresponding to the screen region D and indicated.

At subsequent S280, the cursor position is sent. Similarly to S170 in FIG. 4, the processing is implemented to cause the navigation ECU 12 to send the cursor position to the operation control unit 16. In response to this, the operation control unit 16 generates the driving force applied to the shaft portion 18a, so that the coordinates on the indication screen 10a uniquely coincide with the coordinates in the movable region of the operation knob 18. In this way, the operation knob 18 moves to the corresponding position in the movable region.

At S290, it is determined whether the contraction of the screen region is competed. When it is determined that the contraction of the screen region is competed (S290: YES), the processing proceeds to S300. Alternatively, in the period in which the contraction of the screen region is not competed (S290: NO), the processings from S230 are repeated. The contracting indication of the screen region is implemented stepwise (S260) by repeating the processing from S230. In the example of FIG. 7, the contracting indication is implemented with the screen region B, the screen region D, the screen region E, and the screen region A in this order. In addition, the moving indication of the cursor is also implemented to follow the screen regions (S270). In the example of FIG. 7, the moving indication is implemented with the position B1, the position D1, the position E1, and the position A1 in this order.

It the example of FIG. 7, the roughly divided contraction stages are shown. It is noted that, the update indication may be implemented further finely thereby to contract continuously the screen region in the practical use. At S300, the cursor is modified into the normal design in the normal state. Specifically, in the example of FIG. 7, the tip end portion of the cursor being the round mark is modified into the arrow mark.

At subsequent S310, the counter force information is set. As described above, the counter force information is for defining the counter force map. In the present example, the counter force map is for disturbing the cursor C from moving to the screen region A after being contracted, as shown in FIG. 7.

Subsequently, the effect produced by the navigation device 1 according to the present embodiment will be described. In present embodiment, the cursor position is retrieved (S200 in FIG. 6), and it is determined whether the cursor is located outside the enlarged screen region (S210). When the cursor is outside the screen region (S210: YES), the screen region is contracted, and its indication is updated (S260). In addition, the moving indication of the cursor is implemented to follow the screen region (S270). In the period before the contraction of the screen region is competed, the processings (S260, S270) are repeated. In this way, contraction of the screen region is indicated in a form of animation. In addition, the cursor is moved with the contraction of the screen region. Consequently, a user can recognize that the cursor moves with contraction of the screen region. Thus, a user can be restrained form having uncomfortable feeling due to the movement of the operation knob 18 accompanying with the movement of the cursor.

Furthermore, according to the present embodiment, in the contracting indication of the screen region, the cursor is moved to follow the screen region toward the position at the predetermined distance from the boundary of the screen region and indicated at the position. For example, as shown in FIG. 7, the cursor C is indicated at the positions B1, D1, E1, A1 correspondingly to the screen regions B, D, E, A. With the present configuration, the relation between the contraction of the screen region and the movement of the cursor can be easily recognized. Thus, a user can be effectively restrained from having uncomfortable feeling due to movement of the operation knob 18 accompanying with the movement of the cursor.

Furthermore, according to the present embodiment, in the contracting indication of the screen region, the design of the cursor is modified into the design at the time of contraction (S220 in FIG. 6). In the example of FIG. 7, the tip end portion is changed into the design of the round mark. With the present configuration, the relation between the contraction of the screen region and the movement of the cursor can be easily recognized. Thus, a user can be effectively restrained from having uncomfortable feeling due to movement of the operation knob 18 accompanying with the movement of the cursor.

Furthermore, in the present embodiment, the cursor is located outside the screen region when the contraction of the screen region is completed. In the example of FIG. 7, the cursor is indicated at the outer position A1 of the screen region A. In this way, it is easily recognized that the operation in the screen region is completed. Thus, the configuration contributes to enhancement of the user's operability.

It is conceived that a button, which is once enlarged, is rarely manipulated continuously. In consideration of this, according to the present embodiment, the counter force information is set to define the counter force map so as to disturb the cursor from moving into the screen region (S310 in FIG. 6). In this way, the cursor is restrained from being drawn into the button, which is already operated. Thus, operability can be secured.

In the present embodiment, the counter force information is set to disturb the cursor from moving into the screen region. It is noted that, the counter force information may be set to disturb the cursor from moving into a button indicated in the screen region.

In the present embodiment, when the operation knob 18 is manipulated while the contracting indication is implemented (S240 in FIG. 6: YES), the contracting indication of the screen region is implemented (S250), and the movement of the cursor to follow the screen region is aborted. In this way, a user can start the subsequent operation without waiting for the contraction of the screen region. Therefore, the present configuration contributes to enhancement of operability.

In present embodiment, the navigation device 1 may function as a vehicular device, the display unit 10 may function as an indication unit, and the button indicated on the indication screen 10a may function as a selection item image. In addition, the operation unit 14 may function as an operation unit, the operation knob 18 may function as an operation knob, the driving force generation unit 24 may function as a driver force generation unit, and the navigation ECU 12 may function as a control unit. The cursor moving processing shown in FIG. 6 may be equivalent to a processing being a function of the control unit.

Summarizing the above embodiments, the vehicular device is configured to implement the enlarging indication of the screen region corresponding to the selection item image indicated on the screen of the indication unit thereby to facilitate user's instruction for selecting the selection item image. The selection item image, such as the icon and/or the button, is indicated to accept an instruction of a predetermined command from a user.

In the present configuration, the operation unit includes the operation knob and the driving force generation unit. The operation knob is movable according to operation of a user. The driving force generation unit is configured to cause the driving force for moving the operation knob. The control unit is configured to indicate the cursor on the screen of the indication unit according to the operation data based on operation of the operation knob being sent from the operation unit.

When implementing the contracting indication to return the enlarged screen region subsequent to the enlarging indication of the screen region, the control unit is further configured to indicate the contraction of the screen region to a user in a visually recognizable form, such as an animation form, and to indicate the cursor to follow the screen region.

The operation unit is further configured to cause the driving force generation unit to move the operation knob correspondingly to the position of the cursor, according to the information on the position of the cursor sent from the control unit. More specifically, for example, the contraction of the screen region may be indicated like an animation. For example, the cursor may be moved along with the frame of the screen region. In this way, a user can recognize that the cursor moves with contraction of the screen region. Thus, a user can be restrained form having uncomfortable feeling due to the movement of the operation knob accompanying with the movement of the cursor.

For example, the indication along the screen region may be indication of the cursor to follow the boundary of the screen region at a predetermined distance from the boundary of the screen region. In this case, when the predetermined distance is 0, the cursor may be indicated on the boundary of the screen region being contracted. With the present configuration, the correspondence between the contraction of the screen region and the movement of the cursor can be easily recognized. Thus, a user can be effectively restrained from having uncomfortable feeling due to movement of the operation knob accompanying with the movement of the cursor.

In view of facilitating the recognition of the movement of the cursor with contraction of the screen region, the control unit may be further configured to modify the design of the cursor into the design different from the design in the normal state when implementing the contracting indication. With the present configuration, the correspondence between the contraction of the screen region and the movement of the cursor can be also easily recognized. Thus, a user can be effectively restrained from having uncomfortable feeling due to movement of the operation knob accompanying with the movement of the cursor.

In consideration of the location, where the cursor is returned relative to the screen region being contracted, it is conceivable to determine the cursor to be indicated outside the screen region when the contracting indication of the screen region is completed. In this way, it is easily recognizable that the operation in the screen region is completed. Thus, the configuration contributes to enhancement of the user's operability.

In this case, in view of that the selection item image, to which the enlarging indication is once implemented, is rarely manipulated continuously, the driving force generation unit may be further configured to apply the counter force to the operation knob against operation of a user according to the counter force information being set. In this case, the control unit may be further configured to set the counter force information for disturbing movement of the cursor toward the screen region or the selection item image included in the screen region when completing the contracting indication of the screen region. In this way, the cursor is restrained from being drawn into the selection item image, which is already operated. Thus, operability can be secured.

In consideration that a user may implement the following operation in the course of the contracting indication, the control unit may be further configured to abort the following movement of the cursor toward the screen region when the operation knob is manipulated concurrently to the contracting indication. In this case, the condition when the operation knob is manipulated includes manipulation to disturb movement of the operation knob caused with the movement of the cursor. In this way, a user can start the subsequent operation without waiting for the contraction of the screen region. Therefore, the present configuration contributes to enhancement of operability.

The above processings such as calculations and determinations are not limited being executed by the navigation ECU 12. The control unit may have various structures including the navigation ECU 12 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A vehicular device configured to implement enlarging of a predetermined region of a display screen from a first size to a second size to enlarge a plurality of selection items displayed in the predetermined region, the vehicular device comprising:
   an operation unit including:
      an operation knob movable according to an operation by a user to select among the plurality of selection items; and
      a driving force generation unit configured to generate a driving force for moving the operation knob;
   a control unit configured to indicate a cursor on the display screen according to operation data being sent from the operation unit based on an operation of the operation knob, wherein
   when the cursor enters the region with the first size, the control unit implements the enlarging,
   when the cursor exits the region with the second size, the control unit implements contracting of the predetermined region from the second size to the first size,
   the control unit is further configured to,
      when implementing the contracting:
      indicate the contracting in a form visually recognizable to the user; and
      indicate cursor movement which follows the contracting,
   the operation unit is further configured to cause the driving force generation unit to generate the driving force according to information indicative of a position of the cursor on the display screen, the information being sent from the control unit,
   when the contracting is completed, the control unit sets counter force information for preventing the cursor from entering the region with the first size or from selecting among the plurality of selection items displayed in the predetermined region with the first size, and the operation unit causes the driving force generation unit to generate the driving force according to the counter force information, and
   when the operation knob is manipulated during the implementation of the contracting, the control unit stops the cursor movement which follows the contracting and starts the cursor movement which follows a manipulation of the operation knob.

2. The vehicular device according to claim 1, wherein the control unit is further configured to indicate the cursor movement which follows the contacting such that the cursor is located at a predetermined distance from a boundary of the region.

3. The vehicular device according to claim 1, wherein the control unit is further configured to change a design of the cursor during the implementation of the contracting.

4. The vehicular device according to claim 1, wherein the control unit is further configured to indicate the cursor such that the cursor is located outside the region with the first size when completing the contracting.

5. The vehicular device according to claim 1, wherein the cursor enters the region with the first size, the control unit automatically implements the enlarging.

6. The vehicular device according to claim 5, wherein when the cursor exits the predetermined region with the second size, the control unit automatically implements contracting of the predetermined region from the second size to the first size.

7. The vehicular device according to claim 1, wherein when the cursor exits the predetermined region with the second size, the control unit automatically implements contracting of the predetermined region from the second size to the first size.

8. A method for controlling an operation unit in combination with a control unit of a vehicular device, the method comprising:
   causing the operation unit to send user's operation data of an operation knob to the control unit;
   causing the control unit to indicate a cursor on a screen of an indication unit according to the user's operation data sent from the operation unit;
   causing the control unit to send information on a position of the cursor to the operation unit;
   causing the control unit to implement enlarging of a predetermined region of a display screen from a first size to a second size to enlarge a plurality of selection items displayed in the predetermined region;
   causing the control unit to simultaneously implement:
      contracting of the predetermined region from the second size to the first size in a form visually recognizable for a user; and
      indicating cursor movement which follows the contracting of the predetermined region;
   causing the operation unit to generate a driving force according to the information indicative of the position of the cursor on the display screen sent from the control unit;
   setting counter force information using the control unit when the contracting is complete, the counter force information preventing the cursor from entering the predetermined region with the first size;

providing a driving force generation unit configured to generate a driving force for moving the operation knob;

causing the driving force generation unit to generate the driving force according to the counter force information using the control unit;

stopping the movement of the cursor which follows the contracting when the operation knob is manipulated during the implementation of the contracting and starting the movement of the cursor which follows a manipulation of the operation knob.

9. A non-transitory computer readable medium comprising instructions executed by a computer, the instructions including the method according to claim 8.

10. The vehicular device according to claim 8, wherein the cursor enters the region with the first size, the control unit automatically implements the enlarging.

11. The vehicular device according to claim 10, wherein when the cursor exits the predetermined region with the second size, the control unit automatically implements contracting of the predetermined region from the second size to the first size.

12. The vehicular device according to claim 8, wherein when the cursor exits the predetermined region with the second size, the control unit automatically implements contracting of the predetermined region from the second size to the first size.

* * * * *